(12) United States Patent
Le-Faucheur et al.

(10) Patent No.: US 6,704,582 B2
(45) Date of Patent: Mar. 9, 2004

(54) PERSONALIZED INCOMING CALL SIGNAL FOR COMMUNICATION DEVICES

(75) Inventors: Laurent Le-Faucheur, Antibes (FR); Marc Couvrat, St. Laurent du Var (FR)

(73) Assignee: Texas Instruments Incorporated, Dallas, TX (US)

( * ) Notice: Subject to any disclaimer, the term of this patent is extended or adjusted under 35 U.S.C. 154(b) by 504 days.

(21) Appl. No.: 09/734,299

(22) Filed: Dec. 11, 2000

(65) Prior Publication Data

US 2002/0019250 A1 Feb. 14, 2002

(30) Foreign Application Priority Data

Aug. 8, 2000 (EP) .............................. 00402250

(51) Int. Cl.[7] ............................... H04M 1/00
(52) U.S. Cl. .................. 455/567; 455/415; 379/373.01
(58) Field of Search ................ 455/567, 72, 415; 379/373.01, 373.02, 373.04, 374.01, 374.02

(56) References Cited

U.S. PATENT DOCUMENTS 5,687,227 A   11/1997   Cohrs et al.

FOREIGN PATENT DOCUMENTS

| EP | 1 014 674 A1 | 6/2000 |
| GB | 2 339 644 A | 2/2000 |

OTHER PUBLICATIONS

International Telecommunication Union, *ITU–T 6.162, Characteristics of Compandors for Telephony*, Telecommunication Standardization Sector of ITU, 11/88, pp. 1–8.

*Primary Examiner*—Lee Nguyen
(74) *Attorney, Agent, or Firm*—Ronald O. Neerings; Wade James Brady, III; Frederick J. Telecky, Jr.

(57) ABSTRACT

Apparatus and methods are presented to allow the creation of a personalized audio signal for a communication device., An option to record audio input and create a call signal audio file is selected via an input mechanism (203). Audio input is recorded when a record button (204) is pressed and the recording is terminated when the record button (204) is pressed a second time. Processing circuitry (220) optionally applies audio compression, filtering and encoding algorithms to said audio input and creates a call signal audio file. The call signal audio file is then stored in the memory circuitry designated for call signal audio files (210). Additional audio output circuitry (207) plays the call signal audio file when an incoming call is detected by the transceiver (201).

6 Claims, 1 Drawing Sheet

PERSONALIZED INCOMING CALL SIGNAL FOR COMMUNICATION DEVICES

CROSS REFERENCE TO RELATED APPLICATIONS

The Applicant claims priority under 35 U.S.C. 119 from European Patent Application No. 00402250.5, filed in Europe, Aug. 8, 2000.

This application is related to U.S. patent application Ser. No. 09/779,210 (TI-30144) incorporated herein by reference.

TECHNICAL FIELD OF THE INVENTION

This invention relates in general to telecommunications, and in particular to personalized audio signals for incoming calls on communication devices.

BACKGROUND OF THE INVENTION

Communication devices, e.g. cellular telephones, cellular digital telephones, personal digital assistants, landline telephones, portable computers, and personal computers, are becoming more and more ubiquitous around the world. A large percentage of the population in first world countries already uses one or more communication devices on a daily basis. It is virtually impossible to find any public forum where communication devices are not present in significant numbers; especially those communication devices that allow the user to accept telephone calls. If the market projections of the manufacturers of these communication devices are to be believed, the use of such devices will only grow in the future.

With such ubiquitous presence of communication devices comes an attendant problem: distinguishing the audio signal for an incoming call on an individual communication device from that of other communication devices that may be in the same vicinity. Many manufacturers of communication devices that provide telephone capability have given the user the option to select an audio signal from a limited set of such signals that are preprogrammed into the device. This option helps with the problem but does not totally eliminate it since users of the same type of communication device may select the same audio signal. Also, the audio signals selected by the various manufacturers to pre-program into their devices are very similar.

SUMMARY OF THE INVENTION

A primary object of the present invention is a method and apparatus for creating a personalized audio signal for incoming calls on communication devices. The present invention provides a communication device comprising a mechanism to accept user input for selection of options. In response to selection of an option to create a personalized audio signal, recording circuitry accepts audio input and creates a call signal audio file. This call signal audio file is stored in memory circuitry and is played when an incoming call is detected.

In another form of the invention, processing circuitry on the communication device applies audio compression, filtering and coding algorithms to the recorded audio input when the call signal audio file is created.

These and other features of the invention that will be apparent to those skilled in the art from the following detailed description of the invention, taken together with the accompanying drawings.

DESCRIPTION OF THE DRAWINGS

Corresponding numerals and symbols in the different figures and tables refer to corresponding parts unless otherwise indicated.

DETAILED DESCRIPTION OF THE INVENTION

Aspects of the present invention include apparatus and methods for creating and using a personalized audio signal for a communications device. In the following description, specific information is set forth to provide a thorough understanding of the present invention. Well-known circuits are included in block diagram form in order to not complicate the description unnecessarily. Moreover, it will be apparent to one skilled in the art that specific details of these blocks are not required to practice the present invention.

Figure 1:
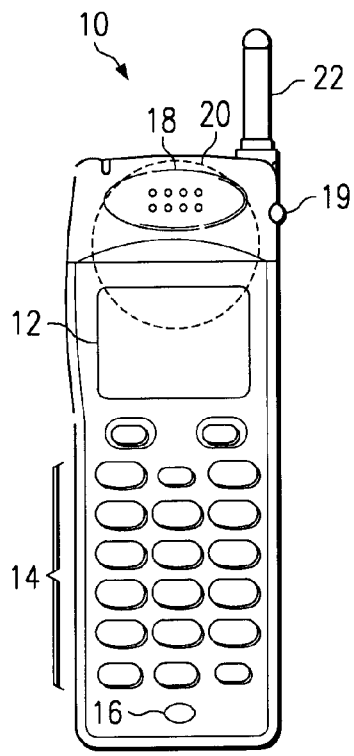
FIG. 1 is a perspective view of an exemplary prior art communication device with the ability to record and replay audio input.

FIG. 1 illustrates an exemplary prior art communication device for providing telephone communications, a Panasonic GD90 GSM dual band digital telephone. The communication device 10 of FIG. 1 is a digital cellular phone. The appearance of device 10 may vary according to its capabilities but most such devices will have similar attributes: a display 12, an input keypad 14 (which may be integrated with display 12 in the form of a touch screen), a microphone 16 for accepting audio input, and a conversation speaker 18 for audio when pressed to a user's ear, a loudspeaker/ringer 20 for playing audio signals, and an antenna 22.

Communication device 10 has the capability to record audio input and store it as an audio file in memory circuitry. This capability is invoked by pressing record button 19 that starts the recording of the audio input on the initial press and stops the recording with a second press. The recorded audio input is stored as an audio file in memory circuitry. For the ensuing paragraphs, record button 19 is considered to be a part of keypad 14 unless otherwise indicated. Other means may be used for starting and stopping of the recording on other communication devices.

Communication device 10 also has special read-only memory circuitry that contains one or more pre-programmed audio signals that may be used to indicate an incoming call. When more than one audio signal is provided, the user may use input keypad 14 in conjunction with text presented on display 12 to select one of these audio signals as the preferred indicator of an incoming call.

FIG. 4 is a block diagram of a communication device 200 with the ability to record and replay audio input and with extensions for storing a personalized audio signal according to the present invention. In the present invention, the function of a communication device represented by device 10 is expanded to allow the creation of a personalized call signal. The recording circuitry and record button 204 of communication device 200 are used to create one or more personalized call signal audio files that are stored in memory circuitry 202. The user may use input keypad 203 in conjunction with text presented on display 212 to select one of these audio signals as the preferred indicator of an incoming call.

Figure 2:
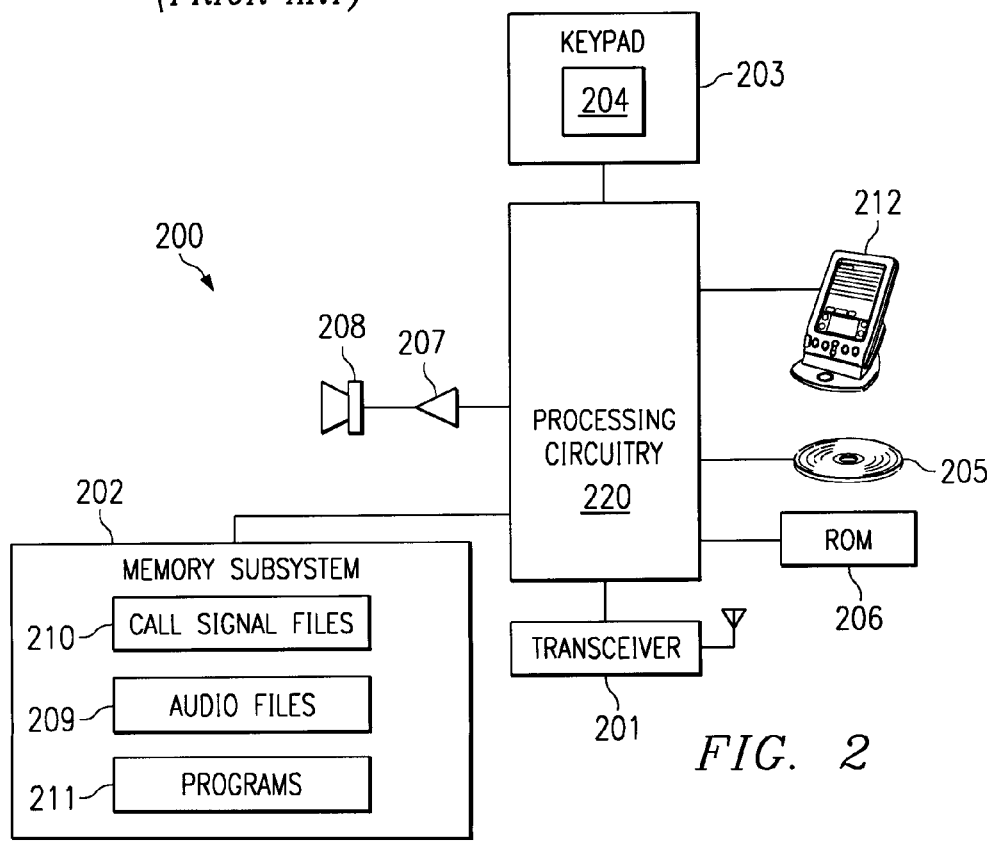
FIG. 2 is a block diagram of a communication device with the ability to record and replay audio input and with extensions for storing a personalized audio signal according to the present invention.

Referring to FIG. 2, the block diagram of communication device 200 illustrates circuitry used in recording and replaying audio files and for storing pre-programmed audio signals. Processing circuitry (typically a digital signal processor (DSP) or a multiple microprocessor/DSP system) 220 is coupled to transceiver 201, memory circuitry 202, keypad 203, record button 204, microphone 205, read-only memory circuitry 206, and audio output circuitry 207. Audio output circuitry 207 is coupled to speaker 208. Memory circuitry 202 includes one or more locations for storing audio files 209 and one or more locations for storing call signal audio files to be used as a personalized incoming call signal 210. Note that other data may also be stored in memory circuitry 202. Read-only memory circuitry 206 contains one or more pre-programmed audio signals that may be used as the incoming call signal.

Memory circuitry 202 may include memory internal to processing circuitry 220, external to processing circuitry 220, or a combination of the two. Processing circuitry 220 may receive data and commands through keypad 203, microphone 205, and from telecommunications signals via transceiver 201.

During operation of communication device 200, processing circuitry 220 executes a number of tasks. For example, processing circuitry 220 monitors inputs from the keypad 203 (including record button 204). If the user presses the appropriate button or buttons to select an option to create a personalized audio signal, processing circuitry 220 initiates the operation responsive to a program stored in program region 211 and waits for the user to start the recording action by pressing record button 204. When record button 204 is pressed, processing circuitry 220 executes the recording action to create and store a call signal audio file. When record button 204 is pressed a second time, the recording action is terminated. After the recording action is terminated, processing circuitry 220 executes algorithms to compress, filter, and encode the recorded audio signals to create the final call signal audio file. Such algorithms are well known to practitioners of the art and are exemplified in technical publications such as ITU-T Recommendation G.162, *Characteristics Of Compandors For Telephony*. The final call signal audio file is stored in a location 210 in memory circuitry 202 designated to contain a call signal audio file. If the user then presses the appropriate button or buttons on keypad 203 to select an option to designate a call signal audio file to be used as an incoming call signal, processing circuitry 220 executes this action.

When a user presses the appropriate button to select an option to create a personalized audio signal, processing circuitry 220 presents a menu on display 212 responsive to control software in memory circuitry 202. By appropriate keypad input, a user can select either microphone 205 or transceiver 201 as a source for the personalized audio signal. Advantageously, this allows a user to record a favorite musical snippet from a nearby radio or CD player, for example, or to select a voice or musical snippet being received via transceiver 201 from a remote location, for example.

Several different personalized audio signals can be stored in memory circuitry 202. Advantageously, a user can select a designated call signal audio file from among the several different personalized audio signals at different times by appropriate keypad input.

Processing circuitry 220 also monitors transceiver 201 for incoming calls directed to communication device 10. When such a call is detected, processing circuitry 220 causes the designated call signal audio file to be played through audio output circuitry 207 as the incoming call signal.

In another embodiment of the present invention, processing circuitry 220 can select one of the several different personalized audio signals in response to data received by transceiver 201 indicating the originating telephone number of an incoming call, as described in related U.S. patent application Ser. No. 09/779,210 (TI-30144).

Figure 3:
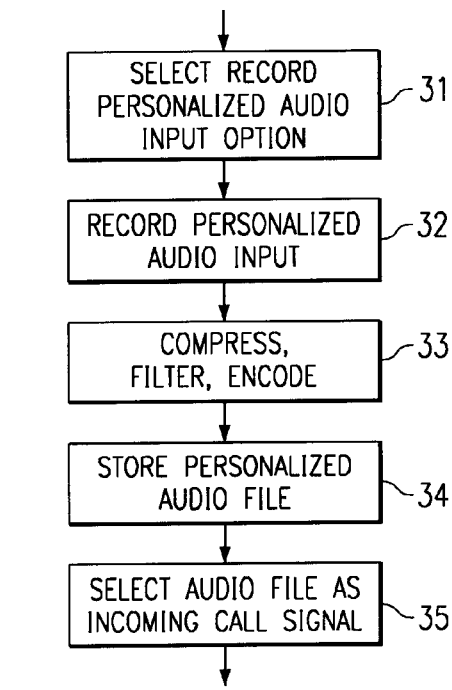
FIG. 3 is a flow graph of a method for creating a personalized audio signal for the communication device of FIG. 2.

FIG. 3 is a flow graph of a method for interfacing to communication device 200 to create a personalized audio call signal for an incoming call. In step 31; an option to record a personalized audio call signal is selected. The audio input that will become the personalized audio call signal is recorded in step 32. In step 33, a call signal audio file is created from the recorded audio input. Optionally, algorithms to compress, filter and encode the audio input to create the call signal audio file are executed during this step. The call signal audio file is stored in memory circuitry 202 in step 34. In step 35, the call signal audio file is designated as the preferred incoming call signal.

The present invention provides a significant advantage over the prior art. It permits the user of a communication device to create a personalized incoming call signal that may be easily differentiated from the incoming call signals of other communication devices in use in the same vicinity.

While the invention has been described with reference to illustrative embodiments, this description should not be construed in a limiting sense. Various other embodiments of the invention will be apparent to persons skilled in the art upon reference to this description. For example, the communication device may be any of a cellular phone, a digital cellular phone, a smart phone, a personal digital assistant, a portable computer, a landline telephone, or a personal computer. Also, it may be possible to create and select among multiple call signal audio files on a communication device. It is therefore contemplated that the appended claims will cover any such modifications of the embodiments as fall within the true scope and spirit of the invention.

What is claimed is:

1. A communication device comprising:
    a mechanism (203) to accept user input for selection of options such that an option to create a call signal audio file may be selected;
    processing circuitry (220) connected to receive user input from the mechanism (203), processing circuitry being operable to record audio input and to thereby create a call signal audio file (210) in response to the selection of the option to create a call signal audio file;
    memory circuitry (202) for storing the call signal audio file connected to the processing circuitry;
    circuitry (207, 208) connected to the processing circuitry for playing the call signal audio file when an incoming call is detected;
    transceiver circuitry (201) connected to the processing circuitry (220), the transceiver circuitry operable to receive an incoming telephone call, wherein the processor circuitry is operable to record a portion of an incoming telephone call and to thereby create a call signal audio file (210) in response to the selection of the option to create a call signal audio file.

2. The communication device of claim 1 wherein said call signal audio file is a recording of the user's voice, music, or other audible sounds.

3. The communication device of claim 2 wherein said communication device is selected from a group comprising a cellular telephone, a cellular digital telephone, a smart telephone, a personal digital assistant, a portable computer, a land line telephone, or a personal computer.

4. The communication device of claim 1, wherein the processing circuitry (220) is operable to apply audio compression, filtering and encoding algorithms to the audio input while creating the call signal audio file.

5. A method of operating a communication device comprising the steps of:

selecting an option (31) to record personalized audio input to be replayed as an audio signal when an incoming call is detected;

receiving an incoming telephone call;

recording (32) a portion of the incoming telephone call as the personalized audio input to create a call signal audio file;

storing (34) the call signal audio file in memory circuitry of the communication device; and selecting (35) the call signal audio file as a signal to be played when an incoming call is detected.

6. The method according to claim 5, further comprising the step of applying compression, filtering, and encoding algorithms (33) to the audio input to create a call signal audio file appropriate for replay as an audio signal.

* * * * *